(12) United States Patent
Raichel et al.

(10) Patent No.: US 7,284,469 B2
(45) Date of Patent: Oct. 23, 2007

(54) PROTECTION FROM KINETIC THREATS USING GLASS-CERAMIC MATERIAL (75) Inventors: Alexander Raichel, Rishon LeZion (IL); Amir Nachumi, Ramat-HaSharon (IL); Svetlana Raichel, Rishon LeZion (IL)

(73) Assignee: GlassCerax Ltd., Ashkelon (IL)

( * ) Notice: Subject to any disclaimer, the term of this patent is extended or adjusted under 35 U.S.C. 154(b) by 220 days.

(21) Appl. No.: 10/928,723

(22) Filed: Aug. 30, 2004

(65) Prior Publication Data

US 2005/0119104 A1 Jun. 2, 2005

Related U.S. Application Data

(63) Continuation-in-part of application No. 10/047,395, filed on Jan. 8, 2002, now Pat. No. 6,825,139.

(60) Provisional application No. 60/259,901, filed on Jan. 8, 2001, provisional application No. 60/575,370, filed on Jun. 1, 2004.

(51) Int. Cl.
*F41H 5/02* (2006.01)
(52) U.S. Cl. ..................................... 89/36.02
(58) Field of Classification Search ................ 89/36.02
See application file for complete search history.

(56) References Cited

U.S. PATENT DOCUMENTS

| | | | | | |
|---|---|---|---|---|---|
| 3,671,374 | A | * | 6/1972 | Kolaik | 422/246 |
| 5,284,806 | A | * | 2/1994 | Gadkaree | 501/8 |
| 5,338,598 | A | * | 8/1994 | Ketcham | 428/210 |
| 5,508,236 | A | * | 4/1996 | Chiang et al. | 501/63 |
| 2002/0193229 | A1 | * | 12/2002 | Miyahara | 501/32 |

* cited by examiner

Primary Examiner—Stephen M. Johnson (57) ABSTRACT

A method for protecting an object from kinetic threats using a glass-ceramic is disclosed. The energy of impact is dissipated as a localized pulverization of the glass-ceramic without extensive shattering of the glass-ceramic. Further, a specific Anorthite glass-ceramic is provided and demonstrated to provide effective protection from multiple kinetic threats.

41 Claims, 3 Drawing Sheets

PROTECTION FROM KINETIC THREATS USING GLASS-CERAMIC MATERIAL

This application is a continuation in part of U.S. patent application Ser. No. 10/047,395, filed on Jan. 8, 2002 now U.S. Pat. No. 6,825,139, which claims priority from U.S. Provisional Patent Application No. 60/259,901, filed on Jan. 8, 2001. This application also claims priority from U.S. Provisional Patent Application No. 60/575,370, filed on Jun. 1, 2004. These applications are hereby incorporated by reference as if fully set forth herein.

FIELD AND BACKGROUND OF THE INVENTION

The present invention relates to the field of materials and specifically to a method for protecting an object from kinetic threats using armor including a glass-ceramic structure. The present invention also provides specific glass-ceramic materials, methods of making the glass-ceramic materials, items and methods of making the items all demonstrated as being useful in protecting objects from kinetic threats.

A sensitive object is often protected by armor interposed between the sensitive object and an approaching kinetic threat and as a result the kinetic threat impacts with the armor instead of with the sensitive object. The armor is configured to neutralize the kinetic threat by one or more methods such as deflection of the kinetic threat, destruction/deformation of the kinetic threat and dissipation of the kinetic energy of the kinetic threat. In the art, known mechanisms for dissipating the kinetic energy of the kinetic threat include deformation of the kinetic threat, deformation of the armor, absorption of the kinetic energy of the kinetic threat and distribution of the kinetic energy over a large area.

Sensitive objects in many fields are increasingly subject to increasingly dangerous kinetic threats.

In the past, kinetic threats in the field of sports were rare. The speed of sports such as motorcycling, automobile racing, skiing and bobsledding has increased to the point where the danger from kinetic threats resulting from collision with static objects has increased significantly. Since sport performance is adversely affected by increased weight, the use of massive armor and shielding devices is impossible, necessitating the use of lightweight but not necessarily effective protection devices. There is a need to provide lightweight but effective protection from kinetic threats for individuals involved in sports.

Modern automobiles are constructed from thin metal or plastic panels designed to minimize vehicular weight and thus increase performance and economy of fuel use. At the same time, the cruising velocity of automobiles has continuously increased. Both factors together have led to an increase in traffic casualties. Although the effects of sudden deceleration cause most traffic casualties, a significant percentage of traffic casualties result from the penetration of objects into the passenger volume of an automobile through the thin panels. In the field of personal transport, there is a need to provide lightweight protection from objects penetrating the passenger volume of personal transport vehicles such as automobiles.

Satellites and space exploration vehicles are generally not protected from kinetic threats due to the prohibitive unit weight cost of launching an object with sufficient armor into orbit and due to the fact that the risk of catastrophic failure, for example resulting from impact with a meteorite, has been judged to be very low. However, the increasing density of debris at desired orbit altitudes ("space junk") increases the chance of such an impact occurring. In the field of aerospace, there is a need to protect satellites and other space vehicles from kinetic threats such as the impact of "space junk" with armor that weighs as little as possible so as to make launch financially feasible. Since satellites are generally not reparable, it is preferred that such protection be useful for protecting against multiple kinetic threats.

In the past, non-military vehicles and installations were not targets for attacks from kinetic threats. Fragment-projecting explosive devices, high-velocity firearms, especially automatic firearms, and large caliber firearms have become increasingly available and at the same time, the will to use these devices and firearms by both criminal and terrorist organizations against civilian and other non-military targets has increased. As a result traditionally "soft" vehicles such as civilian buses and trains, limousines, fuel transport vehicles, police vehicles, logistical vehicles such as trucks and light utility vehicles are increasingly hardened. Traditional armors are heavy. The increase in weight caused by the addition of sufficient armor reduces vehicle mobility, maneuverability and stability, requires a massive and expensive frame, and leads to greater wear and consequent increased acquisition and operating costs. In the field of civil defense and crime fighting there is a need for lightweight, simple to produce and cheap armor to neutralize kinetic threats to military, non-military and civilian vehicles.

Metal armor is generally chosen for protecting combat vehicles and military aircraft from kinetic threats. Increasingly, requirements for air transport and amphibious operation requires that lighter weight armor solutions be found. Prior-art ceramic armors are effective against single kinetic threat impacts but are significantly less effective against the increasingly common multiple and serial kinetic threats posed by fragment-projecting devices, cluster weapons and automatic weapons. There is a need for high-performance, lightweight materials for use in military armor applications with multiple-threat neutralization capabilities.

Individual armor became outmoded with the introduction of firearms. For the first half of the twentieth century it was believed that the small size and mobility of an individual person conferred sufficient defense from kinetic threats and was preferable to weighing down the individual with massive armor. With the increased availability and use of fragment-projecting explosive devices and high-velocity automatic firearms, the survivability of an individual subjected to standard kinetic threats is significantly reduced. As a result individual body armor is becoming standard equipment for high-risk individuals, police and infantry soldiers. However, current body armor materials are either too bulky, reducing the efficacy of the individual in performing standard tasks when worn, or provide insufficient protection from increasingly effective kinetic threats. Further, both fragment-projecting devices and automatic weapons produce multiple kinetic threats for which the protection afforded by currently available body armor is insufficient. In the field of personal defense, there is a need for lightweight body armor protection capable of protecting an individual from multiple kinetic threats such as produced by fragment-projecting explosive devices and high-velocity automatic firearms.

Materials used in currently available armors can be divided into three types: textiles, metals and ceramics.

Textile armors are considered lightweight, easy to produce, simple to install and relatively comfortable to wear as body armor. When a kinetic threat impacts textile armor, the kinetic threat is caught in a web of fibers. The fibers absorb and disperse the energy of the impact to other fibers. Specific textile armors include textiles woven from aramid fibers, e.g. Kevlar® (E.I. du Pont de Nemours and Company) and Twaron® (Teijin Twaron B.V., Arnhem, The Netherlands) and textiles based on polyethylene fibers, e.g. Dyneema® (Koninklijke DSM N.V., Heerlen, The Netherlands). Generally, textile armors are suitable for protecting against low energy threats such as shrapnel small caliber bullets having impact velocities up to about 450 m sec$^{-1}$ but are useless against specially designed armor-piercing rounds and bullets from high-velocity firearms having typical impact velocities of 900 m sec$^{-1}$ unless used in conjunction with a metal or ceramic strike face.

Metal armor provide excellent protection from kinetic threats, are cheap and relatively easy to produce from alloys, usually including aluminum, cobalt, titanium and iron. A kinetic threat impacting metal armor is deflected or deformed and the kinetic energy dissipated by inelastic and elastic deformation of the armor. Metal armor is effective against multiple kinetic threats since damage to the armor caused by the kinetic threat is generally local to the area of impact. However, the weight of metal armor is such that providing sufficient protection against increasingly common kinetic threats is often impractical.

Although expensive, armor made of ceramic plates provides a high level of protection from kinetic threats and is light in weight in comparison to equivalent metal armor. Ceramics most often used for protection of objects from kinetic threats are monolithic ceramics such as $Al_2O_3$, $B_4C$, SiC and AlN.

A kinetic threat impacting ceramic armor is deformed and the kinetic energy dissipated by inelastic deformation of the armor through a combination of a pulverization energy mechanism and a fracture energy mechanism. In the pulverization energy mechanism, a comminution zone of pulverized ceramic in the shape of a conoid emerging from the impact point is produced. In the fracture energy mechanism, kinetic energy is absorbed by the ceramic plate, distributed throughout the plate and subsequently expended by the shattering of the ceramic plate itself along many radial and circumferential cracks. A liner, usually of textile or metal armor located behind the ceramic, absorbs and dissipates any residual kinetic energy of fragments of the ceramic armor and of the kinetic threat. The use of ceramic materials for protecting objects from kinetic threats is discussed in, for example, Medvedovski, *American Ceramic Society Bulletin* (2002), 81 (3), 27-32 and U.S. Pat. No. 3,765,600, U.S. Pat. No. 4,953,442, U.S. Pat. No. 4,911,061, U.S. Pat. No. 4,138,456, U.S. Pat. No. 5,456,156, U.S. Pat. No. 5,469,773, U.S. Pat. No. 5,705,764, U.S. Pat. No. 6,112,635 and U.S. Pat. No. 6,408,733.

In the art it is known that energy dissipation through the fracture energy mechanism is most efficient in ceramic materials that are hard, stiff and have a high sonic velocity. A high stiffness leads to maximal post-impact stress in the ceramic with very little elastic deformation whereas a high sonic velocity spreads the stress throughout the ceramic plate before actual shattering occurs. Ultimately, the impact energy of the kinetic threat is dissipated by the cleavage of many chemical bonds of the ceramic plate, thereby shattering the entire ceramic plate, see for example U.S. Pat. No. 5,469,773. Very hard ceramics are preferred so as to deform the kinetic threat in order to dissipate some kinetic energy and to reduce the chance of follow-through penetration subsequent to ceramic plate shattering.

Due to improved mechanical properties, ceramic-matrix composites are increasingly used instead of monolithic ceramics for protecting objects from kinetic threats. The primary advantage of ceramic-matrix composites compared to monolithic ceramics is improved mechanical properties. Suitable ceramic-matrix composites include fiber-reinforced materials such as $Al_2O_3/SiC$ and $Al_2O_3/C$, ceramic/particulates such as $TiB_2/B_4C$ and $TiB_2/SiC$ and cermets such as SiC/Al, TiC/N and $B_4C/Al$. Ceramic-matrix composites are generally prohibitively expensive to manufacture and process.

The fact that the kinetic energy of an impacting kinetic threat is dissipated by shattering of the ceramic plate means that ceramic armor is generally useful for protecting an object only against impact from a single kinetic threat. Due to the extensive shatter of the ceramic, subsequent impacts have a statistically significant chance to impact on a crack and penetrate with little or no resistance. Further, the shards of the ceramic armor produced by the shattering are relatively small and have little mass: the small size means that there only a few bonds are available for dissipation of energy from subsequent kinetic threat impacting on such a shard and that such a shard may be pushed through by an impacting kinetic threat into the sensitive object being protected.

One method to provide multiple kinetic threat protection involves using many small ceramic scales to cover the surface of a protected object. When an individual small ceramic scale shatters, the protected object is still substantially protected from subsequent threats. Such solutions have many disadvantages, including the high price, added manufacturing complexity and the existence of chinks between any two ceramic scales. Multiple kinetic threats such as those projected by automatic weapons or cluster weapons can incidentally impact at the chinks in the armor or areas where ceramic scales were destroyed by previously impacting kinetic threats. As with shards, the small size of each individual scale means that the amount of energy potentially dissipated is relatively small.

A class of material not often used for protecting against kinetic threats is the family of glass-ceramics.

In U.S. Pat. No. 4,476,653 is taught the use of a glass-ceramic material as armor. A composition of U.S. Pat. No. 4,476,653 includes $Li_2O$ (9.5%-15% by weight), $Al_2O_3$ (1.0%-6.0% by weight), $SiO_2$ (78.5%-84.5% by weight) and $K_2O$ (1.0%-4.0% by weight) as lithium disilicate, cristobalite and spinel crystals in a glassy matrix, where the essential nucleation agent is a combination of $TiO_2$, $ZrO_2$ and $SnO_2$ in a ratio of 3:2:1. A preferred glass-ceramic of U.S. Pat. No. 4,473,653 is reported to have a hardness of between 4.95 and 6.23 GPa, a density of 2.4-2.5 g cm$^{-3}$ and a coefficient of thermal expansion (TCLE) of greater than $100 \times 10^{-7}$° C.$^{-1}$. The maximal $TiO_2$ content in a composition of U.S. Pat. No. 4,473,653 is 3%. The impact of a single kinetic threat (7.62 mm copper jacketed bullet at 152 cm with a muzzle velocity of 777 m sec$^{-1}$) on a 21.7 mm thick glass-ceramic plate of U.S. Pat. No. 4,476,653 leads to shattering of the plate.

In U.S. Pat. No. 5,060,553 is taught the use of monolithic, sintered or hot-pressed glass-ceramic plates for use as armor. Suitable glass-ceramics according to the teachings of U.S. Pat. No. 5,060,553 are silicates of lithium zinc, lithium aluminum, lithium zinc aluminum, lithium magnesium, lithium magnesium aluminum, magnesium aluminum, calcium magnesium aluminum, magnesium zinc, calcium magnesium zinc, zinc aluminum, barium silicate and both calcium phosphates and calcium silico phosphates. In a first embodiment of the teachings of U.S. Pat. No. 5,060,553 is disclosed a composition that includes, in addition to other components, 7% by weight $Al_2O_3$ and 72% by weight $SiO_2$ having a density of 2.45 g cm$^{-3}$, a hardness of 5.7 GPa, and an elastic modulus of 104 GPa. In a second embodiment of the teachings of U.S. Pat. No. 5,060,553 is disclosed a composition that includes, in addition to other components, 13% by weight $Al_2O_3$ and 71% by weight $SiO_2$ having a density of 2.4 g cm$^{-3}$, a hardness of 5.25 GPa, and an elastic modulus of 88 GPa. In a third embodiment of the teachings of U.S. Pat. No. 5,060,553 is disclosed a composition that includes, in addition to other components, 33% by weight $Al_2O_3$ and 36% by weight $SiO_2$ having a density of 3.1 g cm$^{-3}$, a hardness of 10.8 GPa, and an elastic modulus of 150 GPa. In a fourth embodiment of the teachings of U.S. Pat. No. 5,060,553 is disclosed a composition that includes, in addition to other components, 26% by weight $Al_2O_3$ and 50% by weight $SiO_2$ having a density of 2.7 g cm$^{-3}$, a hardness of 6.0 GPa and an elastic modulus of 105 GPa. Although a mechanism for energy dissipation of an impacting kinetic threat is discussed, no report as to the actual ability of the compositions in neutralizing kinetic threats is presented.

In U.S. Pat. No. 5,045,371 is taught armor including ceramic particles dispersed in a glass matrix. In U.S. Pat. No. 5,469,773 is taught armor made of a composition including 92% MgO ceramic powder hot pressed with glass. These materials are not glass-ceramics.

It would be advantageous to have a material that provides protection from a kinetic threat on par with that of ceramics known in the art yet is lighter, is cheaper to manufacture and is more effective against multiple kinetic threats.

SUMMARY OF THE INVENTION

At least some of the objectives above are achieved by the teachings of the present invention.

The teachings of the present invention provide for the use of glass-ceramics for protecting objects against kinetic threats. Although efforts have been made to provide glass-ceramics for protection against kinetic threats, notably U.S. Pat. No. 4,473,653 and U.S. Pat. No. 5,060,553, these efforts have not met with success. Herein, a novel glass-ceramic composition having a predominant Anorthite phase is demonstrated to be highly effective in protecting objects from kinetic threats.

An advantage of glass-ceramics in general, and the composition of the present invention in particular, over other types of ceramics is the low production cost of glass ceramics. One reason for the low production costs of glass-ceramics is the low temperature (compared to monolithic ceramics) at which glass-ceramics are fabricated. An additional reason for the low cost of glass-ceramics is that in contrast to monolithic ceramics made from highly pure components in exact proportions, glass-ceramics are often fabricated from cheap impure starting materials, see for example, Russian patent RU 2052400, English patent GB 1,459,178, as well as U.S. Pat. No. 4,191,546, U.S. Pat. No. 5,521,132 and U.S. Pat. No. 5,935,885.

It has been found that in some cases, glass-ceramics neutralize an impacting kinetic threat primarily through a pulverization energy mechanism as opposed to primarily a fracture energy mechanism. Thus, in some embodiments the teachings of the present invention provide a method of protecting an object from a kinetic threat by providing a shield including a glass-ceramic material of the present invention to dissipate the energy of impact of the kinetic threat by a pulverization energy mechanism. In the pulverization energy mechanism, the shield is pulverized in the immediate vicinity of the impact of a kinetic threat. As pulverization necessarily requires destruction of many bonds, much kinetic energy is dissipated by destruction of only a small part of the shielding material. At the same time, damage caused by an impacting kinetic threat is localized and only a small part of the shielding material destroyed. Since the shield does not significantly crack or shatter, the overall structural integrity of the shield is retained, a fact that gives exceptional efficacy against multiple hits.

According to the teachings of the present invention there is provided a method of protecting an object from kinetic threats by providing the object with armor including a glass-ceramic structure, said glass-ceramic structure comprising an Anorthite phase, causing the kinetic threat to impact with a glass-ceramic structure comprising an Anorthite crystalline phase, the glass-ceramic structure preferably being part of a shielding device. For example, in a specific embodiment of the present invention, a glass-ceramic structure is a scale, a panel or a plate integrated into and/or being part of a shielding device such as a bulletproof vest, body armor, armor plate, armor sheet, panel, helmet or an armored vehicle.

As stated above, according to the present invention, a glass-ceramic structure includes an Anorthite phase. Such an Anorthite phase can make up more than about 40%, more than about 50%, more than about 60%, more than about 70%, more than about 80% and even more than about 90% by weight of the glass-ceramic structure.

In an embodiment of the present invention, the glass-ceramic structure is made up of, amongst other components, CaO and $Al_2O_3$, the weight ratio of CaO to $Al_2O_3$ preferably being between about 1:1.3 and about 1:2.5, between about 1:1.4 and about 1:2.3, between about 1:1.6 and about 1:2.1, between about 1:1.7 and about 1:1.95 or between about 1:1.75 and about 1:1.89.

In an embodiment of the present invention, the glass-ceramic structure is made up of amongst other components, CaO and $SiO_2$, the weight ratio of CaO to $SiO_2$ preferably being between about 1:1.5 and about 1:3.0, between about 1:1.6 and about 1:2.8, between about 1:1.9 and about 1:2.4, between about 1:2.0 and about 1:2.3 or between about 1:2.1 and about 1:2.2.

In an embodiment of the present invention, the glass-ceramic structure is made up of more than about 5.0% by weight CaO.

In an embodiment of the present invention, the glass-ceramic structure is made up of between about 15% and 23% by weight $SiO_2$, between about 13% and 20% by weight $Al_2O_3$ and between about 7% and 11% by weight CaO.

In an additional embodiment of the present invention, the glass-ceramic structure is made up of between about 17% and 26% by weight $SiO_2$, between about 15% and 22% by weight $Al_2O_3$ and between about 8% and 12% by weight CaO.

In an additional embodiment of the preset invention, the glass-ceramic structure is made up of between about 19% and 28% by weight $SiO_2$, between about 16% and 24% by weight $Al_2O_3$ and between about 9% and 13% by weight CaO.

In an additional embodiment of the present invention, the glass-ceramic structure is made up of between about 21% and 31% by weight $SiO_2$, between about 18% and 27% by weight $Al_2O_3$ and between about 10% and 14% by weight CaO.

In an additional embodiment of the present invention, the glass-ceramic structure is made up of between about 22% and 34% by weight $SiO_2$, between about 19% and 29% by weight $Al_2O_3$ and between about 10% and 16% by weight CaO.

In an additional embodiment of the present invention, the glass-ceramic structure is made up of between about 24% and 36% by weight $SiO_2$, between about 21% and 31% by weight $Al_2O_3$ and between about 11% and 17% by weight CaO.

In an additional embodiment of the present invention, the glass-ceramic structure is made up of between about 26% and 39% by weight $SiO_2$, between about 22% and 33% by weight $Al_2O_3$ and between about 12% and 18% by weight CaO.

In an additional embodiment of the present invention, the glass-ceramic structure is made up of between about 28% and 41% by weight $SiO_2$, between about 24% and 36% by weight $Al_2O_3$ and between about 13% and 19% by weight CaO.

In an additional embodiment of the present invention, the glass-ceramic structure is made up of between about 29% and 44% by weight $SiO_2$, between about 25% and 38% by weight $Al_2O_3$ and between about 14% and 20% by weight CaO.

In an additional embodiment of the present invention, the glass-ceramic structure is made up of between about 31% and 46% by weight $SiO_2$, between about 26% and 40% by weight $Al_2O_3$ and between about 14% and 22% by weight CaO.

In a preferred embodiment of the present invention, the glass-ceramic structure includes at least one crystalline phase in addition to an Anorthite crystalline phase. It is preferred that such an additional crystalline phase or phases have a thermal coefficient of linear expansion (TCLE) similar to that of Anorthite, that is between about $5 \times 10^{-7}$ °$C.^{-1}$ and about $250 \times 10^{-7}$ °$C.^{-1}$, preferably between about $10 \times 10^{7}$ °$C.^{-1}$, and $160 \times 10^{-7}$ °$C.^{-1}$ and even more preferably between about $20 \times 10^{-7}$ °$C.^{-}$, and $80 \times 10^{-7}$ °$C.^{-1}$. A suitable additional crystalline phase is crystalline $TiO_2$, especially Rutile.

In a preferred embodiment of the present invention, the glass-ceramic structure includes $TiO_2$ in addition to the Anorthite phase. In an embodiment of the present invention, the glass-ceramic structure includes at least 0.3%, at least 1%, at least 2%, at least 4% or even at least 6% by weight $TiO_2$. Preferably, the glass-ceramic structure of the present invention includes between about 0.3% and 5% or between about 5% and 10% by weight $TiO_2$.

According to the teachings of the present invention, there is also provided a method of manufacturing an item for protecting an object from a kinetic threat by a) providing a glass-ceramic composition including more than about 5% by weight CaO, b) devitrifying the glass composition and c) fashioning the glass composition into a glass-ceramic structure, such as a scale, a panel or a plate. Subsequently, the glass-ceramic structure is integrated into the item. Such items include, but are not limited to, armor plates, armor sheets, bullet-proof vests, body armor, panels, door panels, floor panels, wall panels, helmets, seats, aircraft, rotary wing aircraft, fixed wing aircraft, armored fighting vehicles, limousines and motor vehicles.

To fashion a glass-ceramic structure from the glass composition, devitrification is preferably performed while press molding. Devitrification can be performed using a one-stage or a two-stage crystallization regime.

Generally, devitrification involves melting the glass composition and maintaining the molten glass composition within a certain temperature range for a period of time sufficient to allow crystallization of at least some of the molten glass composition.

In an embodiment of the present invention, the glass composition includes, amongst other components, both CaO and $Al_2O_3$, the weight ratio of CaO to $Al_2O_3$ preferably being between about 1:1.3 and about 1:2.5, between about 1:1.4 and about 1:2.3, between about 1:1.6 and about 1:2.1, between about 1:1.7 and about 1:1.95 or between about 1:1.75 and about 1:1.89.

In an embodiment of the present invention, the glass composition includes, amongst other components, both CaO and $SiO_2$, the weight ratio of CaO to $SiO_2$ preferably being between about 1:1.5 and about 1:3.0, between about 1:1.6 and about 1:2.8, between about 1:1.9 and about 1:2.4, between about 1:2.0 and about 1:2.3 or between about 1:2.1 and about 1:2.2.

In an embodiment of the present invention, the glass composition includes between about 15% and 23% by weight $SiO_2$, between about 13% and 20% by weight $Al_2O_3$ and between about 7% and 11% by weight CaO.

In an additional embodiment of the present invention, the glass composition includes between about 17% and 26% by weight $SiO_2$, between about 15% and 22% by weight $Al_2O_3$ and between about 8% and 12% by weight CaO.

In an additional embodiment of the present invention, the glass composition includes between about 19% and 28% by weight $SiO_2$, between about 16% and 24% by weight $Al_2O_3$ and between about 9% and 13% by weight CaO.

In an additional embodiment of the present invention, the glass composition includes between about 21% and 31% by weight $SiO_2$, between about 18% and 27% by weight $Al_2O_3$ and between about 10% and 14% by weight CaO.

In an additional embodiment of the present invention, the glass composition includes between about 22% and 34% by weight $SiO_2$, between about 19% and 29% by weight $Al_2O_3$ and between about 10% and 16% by weight CaO.

In an additional embodiment of the present invention, the glass composition includes between about 24% and 36% by weight $SiO_2$, between about 21% and 31% by weight $Al_2O_3$ and between about 11% and 17% by weight CaO.

In an additional embodiment of the present invention, the glass composition includes between about 26% and 39% by weight $SiO_2$, between about 22% and 33% by weight $Al_2O_3$ and between about 12% and 18% by weight CaO.

In an additional embodiment of the present invention, the glass composition includes between about 28% and 41% by weight $SiO_2$, between about 24% and 36% by weight $Al_2O_3$ and between about 13% and 19% by weight CaO.

In an additional embodiment of the present invention, the glass composition includes between about 29% and 44% by weight $SiO_2$, between about 25% and 38% by weight $Al_2O_3$ and between about 14% and 20% by weight CaO.

In an additional embodiment of the present invention, the glass composition includes between about 31% and 46% by weight $SiO_2$, between about 26% and 40% by weight $Al_2O_3$ and between about 14% and 22% by weight CaO.

According to a feature of the method present invention, a nucleating agent is provided in the glass composition. Suitable nucleating agents include, but are not limited to, $CeO_2$, $Cr_2O_3$, $F^-$, $Fe_2O_3$, $MnO_2$, $P_2O_5$, $SnO_2$, $SO_4^{2-}$, $S^{2-}$, $TiO_2$, $V_2O_5$, ZnO and $ZrO_2$. A preferred nucleating agent is $TiO_2$.

According to a feature of the present invention, the glass composition also includes $TiO_2$. In an embodiment of the present invention, the glass composition includes at least 0.3%, at least 1%, at least 2%, at least 4% or even at least 6% by weight $TiO_2$. Preferably, the glass composition of the present invention includes between about 0.3% and 5% or between about 5% and 10% by weight $TiO_2$.

According to the teachings of the present invention, there is also provided a glass-ceramic comprising a) Anorthite and b) at least one additional crystalline phase.

According to a feature of the present invention, Anorthite makes up more than 40%, more than 50%, more than 60%, more than 70%, more than 80% and even more than 90% by weight of a glass-ceramic of the present invention.

In an embodiment of the present invention, the glass-ceramic includes, amongst other components, CaO and $Al_2O_3$, the weight ratio of CaO to $Al_2O_3$ preferably being between about 1:1.3 and about 1:2.5, between about 1:1.4 and about 1:2.3, between about 1:1.6 and about 1:2.1, between about 1:1.7 and about 1:1.95 or between about 1:1.75 and about 1:1.89.

In an embodiment of the present invention, the glass-ceramic includes, amongst other components, CaO and $SiO_2$, the weight ratio of CaO to $SiO_2$ preferably being between about 1:1.5 and about 1:3.0, between about 1:1.6 and about 1:2.8, between about 1:1.9 and about 1:2.4, between about 1:2.0 and about 1:2.3 or between about 1:2.1 and about 1:2.2.

In an embodiment of the present invention, the glass-ceramic includes between about 15% and 23% by weight $SiO_2$, between about 13% and 20% by weight $Al_2O_3$ and between about 7% and 11% by weight CaO.

In an additional embodiment of the present invention, the glass-ceramic includes between about 17% and 26% by weight $SiO_2$, between about 15% and 22% by weight $Al_2O_3$ and between about 8% and 12% by weight CaO.

In an additional embodiment of the present invention, the glass-ceramic includes between about 19% and 28% by weight $SiO_2$, between about 16% and 24% by weight $Al_2O_3$ and between about 9% and 13% by weight CaO.

In an additional embodiment of the present invention, the glass-ceramic includes between about 21% and 31% by weight $SiO_2$, between about 18% and 27% by weight $Al_2O_3$ and between about 10% and 14% by weight CaO.

In an additional embodiment of the present invention, the glass-ceramic is made up of between about 22% and 34% by weight $SiO_2$, between about 19% and 29% by weight $Al_2O_3$ and between about 10% and 16% by weight CaO.

In an additional embodiment of the present invention, the glass-ceramic includes between about 24% and 36% by weight $SiO_2$, between about 21% and 31% by weight $Al_2O_3$ and between about 11% and 17% by weight CaO.

In an additional embodiment of the present invention, the glass-ceramic includes between about 26% and 39% by weight $SiO_2$, between about 22% and 33% by weight $Al_2O_3$ and between about 12% and 18% by weight CaO.

In an additional embodiment of the present invention, the glass-ceramic includes between about 28% and 41% by weight $SiO_2$, between about 24% and 36% by weight $Al_2O_3$ and between about 13% and 19% by weight CaO.

In an additional embodiment of the present invention, the glass-ceramic includes between about 29% and 44% by weight $SiO_2$, between about 25% and 38% by weight $Al_2O_3$ and between about 14% and 20% by weight CaO.

In an additional embodiment of the present invention, the glass-ceramic includes between about 31% and 46% by weight $SiO_2$, between about 26% and 40% by weight $Al_2O_3$ and between about 14% and 22% by weight CaO.

It is preferred that at least one of the at least one additional crystalline phases have a TCLE similar to that of Anorthite, that is between about $5 \times 10^{-7}$ °$C.^{-1}$ and about $250 \times 10^{-7}$ °$C.^{-1}$, preferably between about $10 \times 10^{-7}$ °$C.^{-1}$ and about $160 \times 10^{-7}$ °$C.^{-1}$ and even more preferably between about $20 \times 10^{-7}$ °$C.^{-1}$ and about $80 \times 10^{-7}$ °$C.^{-1}$.

In a preferred embodiment of the present invention, at least one of the at least one additional crystalline phases is crystalline $TiO_2$, especially Rutile. In an embodiment of the present invention, the glass-ceramic includes at least 0.3%, at least 1%, at least 2%, at least 4% or even at least 6% by weight $TiO_2$. Preferably, the glass-ceramic of the present invention includes between about 0.3% and 5% or between about 5% and 10% by weight $TiO_2$.

According to the teachings of the present invention there is also provided an article for protecting an object from a kinetic threat, the article including a structure made of the glass-ceramic of the present invention. Such an article generally includes other materials. For example, one other material often included in such an article is a textile, especially a ballistic textile woven or otherwise fashioned from fibers such as aramid and polyethylene fibers. For example, one other material often includes in such an article is a metal, such as a metal plate.

Generally an article of the present invention has a shape depending on the designated use and the object to be protected. Preferred shapes include, but are not limited to, armor plate, armor sheets, bullet-proof vests, body armor, panels, door panels, floor panels, wall panels, helmets, seats, aircraft, rotary wing aircraft, fixed wing aircraft, armored fighting vehicles, limousines and motor vehicles.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. In case of conflict, the patent specification, including definitions, will control. In addition, the materials, methods, and examples are illustrative only and not intended to be limiting.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DESCRIPTION OF THE PREFERRED EMBODIMENTS

The present invention is of the use of glass-ceramics for protecting objects from a kinetic threat. The present invention is also of methods for protecting an object from a kinetic threat. The present invention is also of a method of manufacturing an item for protecting an object from a kinetic threat. The present invention is also of a glass-ceramic composition. The present invention is also of an article for protecting an object from a kinetic threat.

As used herein, the terms "comprising" and "including" or grammatical variants thereof are to be taken as specifying the stated features, integers, steps or components but do not preclude the addition of one or more additional features, integers, steps, components or groups thereof. This term encompasses the terms "consisting of" and "consisting essentially of".

The phrase "consisting essentially of" or grammatical variants thereof when used herein are to be taken as specifying the stated features, integers, steps or components but do not preclude the addition of one or more additional features, integers, steps, components or groups hereof but only if the additional features, integers, steps, components or groups thereof do not materially alter the basic and novel characteristics of the claimed composition, device or method.

As used herein, the term "process" and the term "method" refers to manners, means, techniques and procedures for accomplishing a given task including, but not limited to, those manners, means, techniques and procedures either known to, or readily developed from known manners, means, techniques and procedures by practitioners of the chemical, material, defense and ceramic arts.

The principles and uses of the processes, compositions and methods of the present invention may be better understood with reference to the description and examples hereinbelow.

Before explaining at least one embodiment of the present invention in detail, it is to be understood that the present invention is not limited in its application to the details set forth in the following description or exemplified by the Examples. The present invention is capable of other embodiments or of being practiced or carried out in various ways. Also, it is to be understood that the phraseology and terminology employed herein is for the purpose of description and should not be regarded as limiting.

In the present invention it has been found that glass-ceramics are a class of materials useful for protecting objects from kinetic threats. Glass-ceramics are compositions containing one or more crystalline phases uniformly distributed in a glassy (amorphous) phase. Glass-ceramics are formed by devitrification of molten glass, usually in the presence of a nucleating agent, the crystalline phase or phases produced by cooling a molten glass composition so that a portion of the composition crystallizes while the remainder of the composition (the matrix) solidifies in a glassy state. The crystalline phase or phases are typically uniformly dispersed throughout the glassy phase and generally constitute at least 50 percent by weight of the total composition. Glass-ceramics generally have high strength, high thermal conductivity, low thermal expansion, are resistant to thermal shock and are cheaply and easily fabricated.

Generally, the physical properties of a glass-ceramic material are dependent on number of material properties. The first property is the identity and relative abundance of the crystal phase or phases. The second property is the ratio of crystalline phase to amorphous phase. Generally, the higher the proportion of the amorphous phase the softer and more frangible the glass-ceramic. The third property is crystal size. The smaller the crystals, the more difficult it is for cracks to spread throughout a glass-ceramic structure, making such a structure more robust. Generally, when the crystals are smaller than 1 micron in diameter the structure is sufficiently robust for most implementations.

Figure 1:
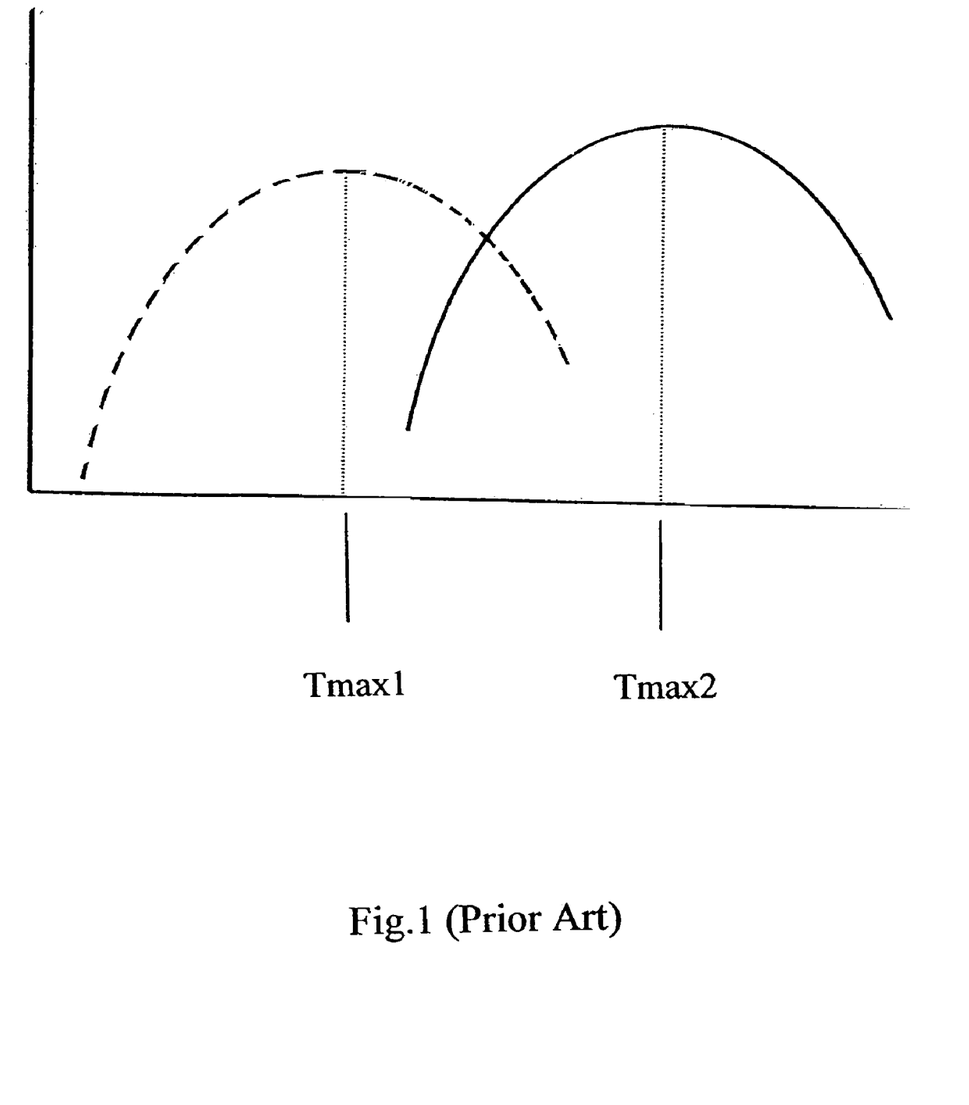
FIG. 1 (prior art) is a graph showing the relationship between temperature and the nucleation center formation rate (dashed) and the crystallization rate (solid)

The crystal size and crystal content in a glass-ceramic material is dependent on at least two production parameters: the rate of formation of nucleation centers (which occurs at a maximal rate at some temperature $T_{max1}$) and the rate of crystal growth (which occurs at a maximal rate at some temperature $T_{max2}$, where $T_{max2} > T_{max1}$), see FIG. 1. Ideally, once $T_{max1}$ and $T_{max2}$ are known, a crystallization regime can be formulated. The problem is that $T_{max1}$ and $T_{max2}$ are dependent on many factors, are not predictable and fluctuate depending on many conditions.

As a compromise, in the art it is known to use either a one-stage crystallization regime or a two-stage crystallization regime.

In a one-stage crystallization regime, a molten composition is maintained at a single temperature midway between $T_{max1}$ and $T_{max2}$, the single temperature giving an acceptable compromise of properties.

In a two-stage crystallization regime, a molten composition is maintained at a first temperature, the first temperature being roughly $T_{max1}$. After a certain amount of time deemed sufficient for formation of enough nucleation centers, the temperature of composition is raised to a second higher temperature, the second temperature being roughly $T_{max2}$.

An important advantage of glass-ceramics over other ceramics used in armor applications is the low cost of production. Glass-ceramics are made by heating a substrate to a temperature that is low in comparison to temperatures required for producing monolithic ceramics. Thus, the cost of energy and the cost of vessels necessary for producing glass-ceramic are relatively low in comparison to those of monolithic ceramics. Since glass-ceramics are well defined crystalline phases found within an amorphous glassy matrix, the requirements for composition of a substrate from which a glass-ceramic are made are lenient. Thus, an additional reason for the low cost of glass-ceramics is that in contrast with ceramics used in armor applications made from highly pure components in exact proportions, glass-ceramics are often fabricated from cheap impure starting materials such as ores and sand or industrial slag and ash, see for example, Russian patent RU 2052400, English patent GB 1,459,178, as well as U.S. Pat. No. 4,191,546, U.S. Pat. No. 5,521,132 and U.S. Pat. No. 5,935,885.

As discussed above, the fracture energy mechanism by which monolithic ceramic armors dissipate energy is not an optimum way for dissipating the energy of kinetic threat. The fracture energy mechanism produces many potentially dangerous ceramic shards and renders a shield device useful against only a single kinetic threat. It has been found that at least some glass-ceramics dissipate the energy of impact of a kinetic threat primarily by a pulverization energy mechanism instead of by primarily a fracture energy mechanism.

Thus, the aim of the present invention is to provide a method for protecting an object from kinetic threats by dissipating energy according to three concepts. The first concept is that damage to a shielding device caused by a kinetic threat is localized to the vicinity of impact. The second concept is that energy dissipation through breaking of chemical bonds is minimized by a pulverization energy mechanism rather than a fracture energy mechanism. The third concept is that the formation of harmful shards, ricochets, spatters and spalls that may damage the protected object or other objects in the vicinity is preferably reduced if not eliminated.

A material for implementing the method of the present invention is preferably, but not necessarily, harder than the kinetic threat. When a kinetic threat impacts a harder shield material, the kinetic threat itself deforms and fragments, a process that dissipates kinetic energy. Further, fragmentation of an impacting kinetic threat reduces the chance of ricochet or follow-through penetration.

In the art, ceramics used in protecting against kinetic threats are chosen to be brittle and as hard as possible. These properties enhance the extensive shattering of the ceramic material so as to maximize the amount of kinetic energy used for breaking chemical bonds of the ceramic material. In contrast, a material used in protecting an object according to the teachings of the present invention is preferably hard enough so as to deform and fragment the kinetic threat, but not be brittle. Thus, in contrast to the prior art where ceramic materials used for protection against kinetic threats have a hardness of greater than 12 GPa [HV] (see, for example U.S. Pat. No. 5,443,917), materials useful in implementing the teachings of the present invention optionally, but not necessarily, have a hardness of less than about 12 GPa [HV], less than about 11 GPa [HV], less than about 10 GPa [HV] and even less than about 9 GPa [HV].

In order to prevent shattering, a material used in implementing the method of the present invention preferably has a relatively high bending strength.

Further, materials used in implementing the teachings of the present invention preferably, but not necessarily, have a relatively low sonic velocity and low stiffness so as to localize damage caused by impact of a kinetic threat. Thus, in contrast to the prior art where ceramic materials used for protection against kinetic threats have a sonic velocity of greater than about 10 km sec$^{-1}$, materials useful in implementing the teachings of the present optionally have, depending on the exact embodiment, a sonic velocity of less than about 9 km sec$^{-1}$, less than about 8 km sec$^{-1}$, less than about 7 km sec$^{-1}$ and even less than about 6 km sec$^{-1}$.

Proof of Concept

To reduce the innovative hypothesis of the present invention to practice, a novel glass-ceramic was designed, produced and tested. The glass-ceramic of the present invention is the currently known best mode of practicing the teachings of the present invention.

Glass-ceramics are characterized by the presence of one or more different crystalline phases, each crystalline phase having a characteristic stochiometry. It is known in the art that it is possible to produce glass-ceramics having specific crystalline phases by choosing glass compositions having appropriate ratios of compounds, proper crystallization conditions and appropriate nucleating agents. Many different crystalline phases are useful in implementing the teachings of the present invention using a glass-ceramic. One suitable crystalline phase is Anorthite.

Anorthite (stochiometric ratio 1 CaO:1 Al$_2$O$_3$:2 SiO$_2$ and weight ratio 1 CaO:1.82 Al$_2$O$_3$:2.14 SiO$_2$) is a triclinic feldspar having a density of about 2.75 g cm$^{-3}$, a melting temperature of about 1550° C., a thermal coefficient of linear expansion (TCLE) of about 40×10$^{-7\circ}$ C.$^{-1}$, a dielectric constant of 6.9, and a hardness of about 10 HV [GPa]. By weight, Anorthite is 20% CaO, 37% Al$_2$O$_3$ and 43% SiO$_2$. Due to the relatively low density, sufficient hardness (harder than the about 8 HV [GPa] of the hardest steel) and relatively low melting temperature (to reduce production costs) Anorthite was selected to be the predominant crystalline phase of a glass-ceramic for implementing the teachings of the present invention.

Preferred embodiments of glass-ceramics used in implementing the teachings of the present invention include more than about 40% by weight Anorthite, more than about 50% by weight Anorthite, more than about 60% by weight Anorthite, more than about 70% by weight Anorthite, more than about 80% by weight Anorthite, and even more than about 90% by weight Anorthite.

Further, when considering that in Anorthite the weight ratio of CaO to Al$_2$O$_3$ is 1:1.82, in a preferred embodiment of a glass-ceramic of the present invention and in a composition of the present invention used for making a glass-ceramic the weight ratio of CaO to Al$_2$O$_3$ is between about 1:1.3 and about 1:2.5, between about 1:1.4 and 1:2.3, between about 1:1.6 and 1:2.1, between about 1:1.7 and 1:1.95 and between about 1:1.75 and 1:1.89. At the same time, when considering that in Anorthite the weight ratio of CaO to SiO$_2$ is 1:2.14, in a preferred embodiment of a glass-ceramic of the present invention and in a composition of the present invention used for making the glass-ceramic the weight ratio of CaO to SiO$_2$ is between about 1:1.5 and about 1:3.0, between about 1:1.6 and 1:2.8, between about 1:1.9 and 1:2.4, between about 1:2.0 and 1:2.3 and between about 1:2.1 and 1:2.2.

Compositions of some suitable glass-ceramic of the present invention having a predominant Anorthite crystalline phase are listed in Table 1.

TABLE 1

Suitable glass-ceramics of the present invention

| | SiO$_2$ (weight %) | Al$_2$O$_3$ (weight %) | CaO (weight %) |
|---|---|---|---|
| 1 | 17–21 | 15–18 | 8–10 |
| 2 | 19–24 | 17–20 | 9–11 |
| 3 | 21–26 | 18–22 | 10–12 |
| 4 | 23–28 | 20–24 | 11–13 |
| 5 | 25–31 | 22–26 | 12–14 |
| 6 | 27–33 | 23–28 | 13–15 |
| 7 | 29–35 | 25–31 | 14–17 |
| 8 | 31–38 | 27–33 | 14–18 |
| 9 | 33–40 | 28–35 | 15–19 |
| 10 | 35–43 | 30–37 | 16–20 |
| 11 | 15–23 | 13–20 | 7–11 |
| 12 | 17–26 | 15–22 | 8–12 |
| 13 | 19–28 | 16–24 | 9–13 |
| 14 | 21–31 | 18–27 | 10–14 |
| 15 | 22–34 | 19–29 | 10–16 |
| 16 | 24–36 | 21–31 | 11–17 |
| 17 | 26–39 | 22–33 | 12–18 |
| 18 | 28–41 | 24–36 | 13–19 |
| 19 | 29–44 | 25–38 | 14–20 |
| 20 | 31–46 | 27–40 | 14–22 |

When producing a glass-ceramic, it is important to select a suitable nucleating agent. Many nucleating agents are known, including but not limited to CeO$_2$, Cr$_2$O$_3$ (provided, for example, as Cr$_2$O$_3$.FeO), F$^-$ (provided, for example, as Na$_3$AlF$_6$), Fe$_2$O$_3$, MnO$_2$, P$_2$O$_5$ (provided, for example, as phosphate), SnO$_2$ (provided, for example, as Cassiterite, Sn$_2$O$_4$), SO$_4^{2-}$, S$^{2-}$, TiO$_2$ (provided, for example, as Rutile or Ilmenite FeTiO$_3$), V$_2$O$_3$, ZnO and ZrO$_2$ (provided, for example, as Zircon ZrSiO$_4$).

Often it is desirable, to provide a glass-ceramic having more than one crystalline phase. When more than one crystalline phase is present in a glass-ceramic, it is important that the different crystalline phases have matching physical properties. For example, to reduce internal stress during dissipation of thermal energy in a glass-ceramic it is preferred that the component crystalline phases have a similar TCLE.

$TiO_2$ is a well-known nucleating agent for producing glass-ceramics. Rutile ($\alpha$-$TiO_2$) is a tetragonal oxide, having a density of about 4.2 g cm$^{-3}$, a melting temperature of 1825° C., a TCLE of about 78×10$^{-7}$° C.$^{-1}$, a dielectric constant of between 89 and 173, and a hardness of about 10 HV [GPa]. Since Rutile has a TCLE similar to that of Rutile and since $TiO_2$ is an effective nucleating agent, a glass-ceramic produced using $TiO_2$ as a nucleating agent and Rutile as a secondary crystalline phase is a preferred glass-ceramic for implementing the teachings of the present invention.

In summary, although many different glass-ceramics are suitable for implementing the teachings of the present invention, a glass-ceramic having Anorthite as a predominant crystalline phase is preferred due to advantageous physical properties and low cost of production resulting from a low melting point. Although many nucleating agents are suitable for implementing the teachings of the present invention, when Anorthite is a predominant crystal phase it is preferred to use $TiO_2$ as a nucleating agent. $TiO_2$ is not only an effective nucleating agent, but Rutile is an exceptionally suitable secondary crystalline phase for an Anorthite-containing glass-ceramic. Therefore, a preferred glass-ceramic for implementing the teachings of the present invention is an Anorthite or an Anorthite/Rutile glass-ceramic.

When an Anorthite glass-ceramic of the present invention includes TiO2 as a nucleating agent, preferred embodiments include more than about 0.3% by weight $TiO_2$, more than about 1% by weight $TiO_2$, more than about 2% by weight $TiO_2$, more than about 4% by weight $TiO_2$, and even more than about 6% by weight $TiO_2$.

The composition of some suitable glass-ceramic of the present invention, predicted to have a predominant Anorthite crystalline phase and TiO2 as a nucleating agent are listed in Table 2.

TABLE 2

Suitable glass-ceramics of the present invention

| | $SiO_2$ (weight %) | $Al_2O_3$ (weight %) | CaO (weight %) | $TiO_2$ (weight %) |
|---|---|---|---|---|
| 1 | 15–23 | 13–20 | 7–11 | 0.3–5 |
| 2 | 17–26 | 15–22 | 8–12 | 0.3–5 |
| 3 | 19–28 | 16–24 | 9–13 | 0.3–5 |
| 4 | 21–31 | 18–27 | 10–14 | 0.3–5 |
| 5 | 22–34 | 19–29 | 10–16 | 0.3–5 |
| 6 | 24–36 | 21–31 | 11–17 | 0.3–5 |
| 7 | 26–39 | 22–33 | 12–18 | 0.3–5 |
| 8 | 28–41 | 24–36 | 13–19 | 0.3–5 |
| 9 | 29–44 | 24–36 | 14–20 | 0.3–5 |
| 10 | 31–46 | 25–38 | 14–22 | 0.3–5 |
| 11 | 15–23 | 13–20 | 7–11 | 5–10 |
| 12 | 17–26 | 15–22 | 8–12 | 5–10 |
| 13 | 19–28 | 16–24 | 9–13 | 5–10 |
| 14 | 21–31 | 18–27 | 10–14 | 5–10 |
| 15 | 22–34 | 19–29 | 10–16 | 5–10 |
| 16 | 24–36 | 21–31 | 11–17 | 5–10 |
| 17 | 26–39 | 22–33 | 12–18 | 5–10 |
| 18 | 28–41 | 24–36 | 13–19 | 5–10 |
| 19 | 29–44 | 25–38 | 14–20 | 5–10 |
| 20 | 31–46 | 27–40 | 14–22 | 5–10 |

TABLE 2-continued

Suitable glass-ceramics of the present invention

A specific glass-ceramic of the present invention having a predominant Anorthite phase and using $TiO_2$ as a nucleating agent was prepared (see below) and shown to have mechanical characteristics predicted to be suitable for implementing the teachings of the present invention. It is important to note that the glass-ceramic of the present invention has a high $TiO_2$ content so it is expected that the $TiO_2$ crystallized to form Rutile as a secondary crystalline phase. Although not confirmed, it is assumed that the $TiO_2$ crystallized into Rutile as the glass-ceramic was allowed to crystallize at 1500° C., and due to the fact that both alternate $TiO_2$ crystalline forms, Brookite and Anatase, convert to Rutile at low temperatures (750° C. and 915° C., respectively).

In Russian patent RU 2052400 is taught a glass composition made from an ash-slag waste substrate, where the ash-slag substrate contains 9%-54% by weight CaO, 13%-75% by weight $SiO_2$, 5%-26% by weight $Al_2O_3$ and 0.2% by weight $TiO_2$. Between 3% and 8% graphite by weight is added to the molten substrate to reduce oxides to carbides, especially $SiO_2$ to carborundum. Devitrification of the glass to produce a glass-ceramic is discussed in one embodiment of RU 2052400. The relatively high CaO content coupled with the relatively low $Al_2O_3$ content and the relatively low $SiO_2$ content (especially after reduction to carborundum) precludes the formation of a significant Anorthite phase. Further, the low $TiO_2$ content precludes the formation of a crystalline $TiO_2$ phase.

In French patent application FR 7,436,270 (published as FR 2,367,027) are taught glass-ceramics produced from ash and other industrial waste. The composition most rich in $Al_2O_3$ taught therein comprises 15% $Al_2O_3$ to which is added 40% by weight phonolite. As phonolite comprises 21% $Al_2O_3$, the final composition includes only 23.4% $Al_2O_3$. Further, the low $Al_2O_3$ content together with the relatively high CaO and $SiO_2$ content preclude the formation of a significant Anorthite phase.

In English patent GB 1,459,178 are taught glass-ceramics produced from ash and other industrial waste. The formation of Anorthite is neither taught nor disclosed and not recognized as being of any significance. Since formation of Anorthite is dependent on a proper ratio of $SiO_2$, $Al_2O_3$ and CaO Anorthite formed in a glass-ceramic of GB 1,459,178 is formed, if at all, incidentally and not as a predominant phase. In the two examples described a dearth of CaO makes the formation of Anorthite at best insignificant. Further, GB 1,459,178 teaches that BaO and/or ZnO are critical components of a glass-ceramic. Whereas some embodiments of a glass-ceramic of the present invention may include some BaO and/or ZnO, most embodiments of the present invention are devoid of these two components. In some embodiments of the present invention, BaO and/or ZnO may be incidentally present.

The mechanical properties of a glass-ceramic of the present invention are compared to the mechanical properties of monolithic ceramics known in the art as useful for protecting objects from kinetic threats in Table 3.

TABLE 3

Comparison of mechanical properties of ballistic monolithic ceramics with mechanical properties of a glass-ceramic of the present invention (from Medvedovski American Ceramic Society Bulletin (2002), 81 (3), 27–32 and from U.S. Pat. No. 5,443,917.)

| | present invention | $Al_2O_3$ | $B_4C$ | SiC | AlN | $TiB_2$ |
|---|---|---|---|---|---|---|
| Density [g cm$^{-3}$] | 2.7 | 3.6–3.9 | 2.45–2.52 | 3.2–3.3 | 3.25 | 4.48–4.51 |
| TCLE [° C.$^{-1}$] | 52 × 10$^{-7}$ | | | | | |
| Porosity | <0.02% | | | | | |
| bending strength [MPa] (before strengthening) | 150 | | | | | |
| bending strength [MPa] (after strengthening) | 300 | 200–400 | 200–360 | 600–730 | 310 | 270–400 |
| compressive strength [GPa] | 1 | 6.6 | 6.97 | 5.84 | — | 4.6 |
| Hardness GPa [HV] | 9.3–10 | 12–18 | 29–35 | — | 13 | 22–25 |
| Young's Modulus [GPa] | 100 | 300–450 | 440–460 | 440–450 | 380–400 | 550 |
| Sonic velocity [km sec$^{-1}$] | 6 (calc.) | 9.5–11.6 | 13.0–13.7 | 11.2–12.0 | 11 | 11–11.3 |

It is seen that the bending strength of the Anorthite/$TiO_2$ glass-ceramic of the present invention is comparable to that of known monolithic ballistic ceramics. It is also seen that, as predicted, the hardness of the glass-ceramic is significantly lower than that of the prior art monolithic ceramics used in armor applications. At the same time, it is seen that both the sonic velocity and the stiffness of the glass-ceramic (as described by Young's modulus) are significantly less than that of the prior art monolithic ceramics used in armor applications.

Twelve 1 cm thick fabric-lined plates made of the Anorthite/$TiO_2$ glass-ceramic of the present invention were tested in accordance with the NIJ 0101.03 (formulated and published by the National Institute of Justice of the United States Department of Justice) and shown to effectively neutralize kinetic threats at the III and III-A levels. The results of the ballistic tests are summarized in Table 4.

TABLE 4

Ballistic tests of glass-ceramic plates

| | kinetic threat | shots | Impact velocity (m sec$^{-1}$) | result |
|---|---|---|---|---|
| I | NATO ball | 8 | 838–851 | localized pulverization, no penetration |
| II | M855 | 6 | 953–968 | localized pulverization, no penetration |
| III | NATO ball | 6 | 840–846 | localized pulverization, no penetration |
| IV | M855 | 6 | 955–970 | localized pulverization, no penetration |
| V | SS109 | 3 | 948–963 | localized pulverization, no penetration |
| | M193 ball | 3 | 1021–1026 | |
| VI | 7.62 × 51 ball | 9 | 830–844 | localized pulverization, no penetration |
| VII | 7.62 × 51 ball | 8 | 829–841 | localized pulverization, no penetration |
| VIII | NATO ball | 8 | 820–841 | localized pulverization, no penetration |
| IX | NATO ball | 8 | 920–850 | localized pulverization, no penetration |
| X | NATO ball | 7 | 825–847 | localized pulverization, no penetration |
| XI | NATO ball | 9 | 831–852 | localized pulverization, no penetration |
| XII | SS109 | 6 | 943–951 | localized pulverization, no penetration |

As is seen from Table 4, plates made from the Anorthite/$TiO_2$ glass-ceramic of the present invention neutralized serious kinetic threats. Under the test conditions, neither penetration nor follow-through occurred. The backface deformation of all plates, the trauma effect, did not exceed acceptable standard values.

Figure 2:
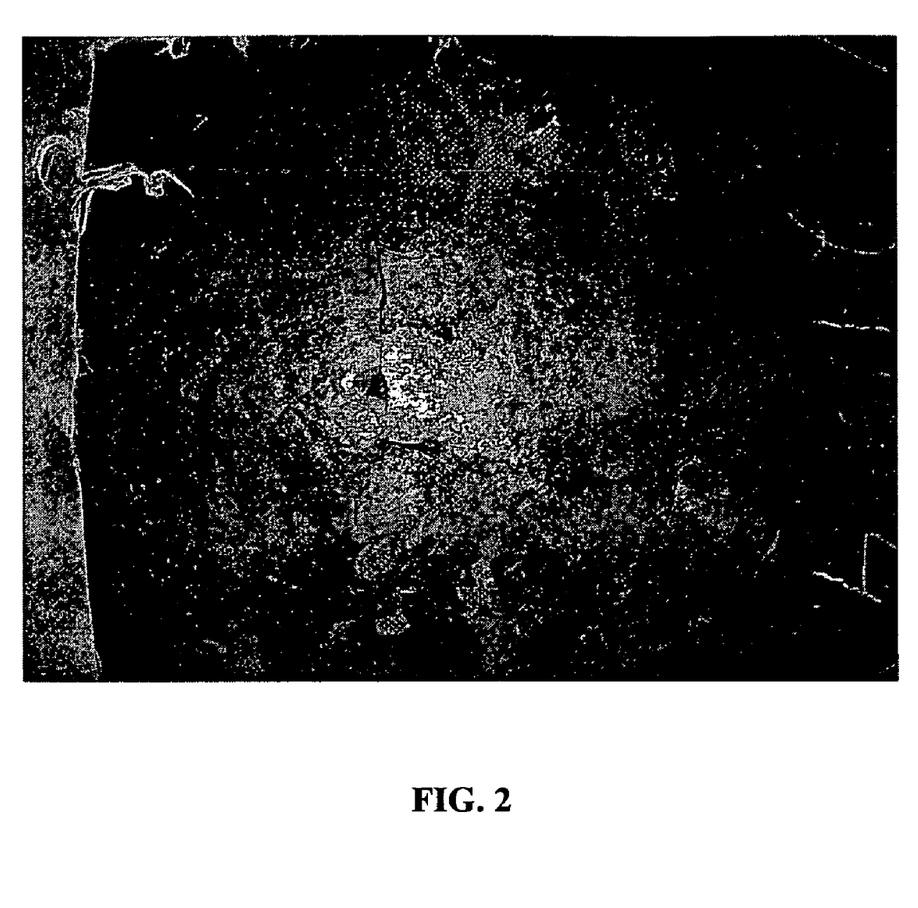
FIG. 2 is an image of the damage caused to a plate of the composition of the present invention by impact of multiple bullets.

In FIG. 2, an image of plate XII after the impact of three SS109 bullets at an impact velocity of between 943 and 951 m sec$^{-1}$ is shown. It is seen that the plate did not shatter and damage caused by each bullet is localized to a respective impact site. The damage to the plate was localized pulverization producing a fine powder.

A 1 cm thick plate made of the Anorthite/$TiO_2$ glass-ceramic of the present invention was tested for resistance against consecutive impact of six M-80 bullets using the plasticine test. The result of the plasticine test is summarized in Table 5.

TABLE 5

Plasticine test of glass-ceramic plate of the present invention

| Round nr. | Impact angle | Impact velocity [m sec$^{-1}$] | Result | Trauma depth [mm] |
|---|---|---|---|---|
| 1 | 0 | 849 | localized pulverization, No penetration | 4 |
| 2 | 0 | 845 | localized pulverization, No penetration | 10 |
| 3 | 0 | 850 | localized pulverization, No penetration | 11 |
| 4 | 0 | 845 | localized pulverization, No penetration | 17 |
| 5 | 0 | 846 | localized pulverization, No penetration | 12 |
| 6 | 0 | 839 | localized pulverization, No penetration | 16 |

As is seen from Table 5, a plate made from the Anorthite/$TiO_2$ glass-ceramic of the present invention neutralized consecutive impact of six M-80 bullets. The measured trauma effect did not exceed acceptable values.

In conclusion, it has been demonstrated that glass-ceramics of the present invention are exceptionally useful in protecting objects from kinetic threats. Further, it has been demonstrated that the pulverization energy mechanism of energy dissipation is superior to the fracture energy mechanism as it produces localized damage to the shielding device, giving multiple threat protection capability, and avoids production of dangerous fragments and shards. Further, it has been confirmed that a material having certain physical properties dissipates energy through the pulverization energy mechanism.

EXAMPLES

Reference is now made to the following example that, together with the above description, illustrate the invention in a non-limiting fashion Materials, Instruments and Experimental Methods Materials:

Coal ash was obtained from the Rutenberg Power Plant (Ashkelon, Israel), the plant burning coal supplied by Total-FinaElf S.A., South Africa. The composition of the coal ash was $SiO_2$ (46.5% by weight), $Fe_2O_3$ (3.7% by weight), $Al_2O_3$ (30.1% by weight), $TiO_2$ (1.6% by weight), CaO (10% by weight), MgO (1.9% by weight), $SO_3$ (2.3% by weight), $Na_2O$ (0.2 by weight), $P_2O_5$ (2.2 by weight), and $K_2O$ (0.4% by weight).

Rutile sand was obtained from Richards Bay Iron and Titanium (PTY) Ltd. (Richards Bay, Republic of South Africa). The composition of the Rutile sand was $TiO_2$ (89% by weight), $Fe_2O_3$ (2.5% by weight), $ZrO_2$ (2% by weight), P (0.04% by weight), S (0.008% by weight), $SiO_2$ (3% by weight), $Al_2O_3$ (0.88% by weight), CaO (0.25% by weight), MgO (0.08% by weight), $Cr_2O_3$ (0.14% by weight), $V_2O_5$ (0.45% by weight), MnO (0.03% by weight) and $Nb_2O_5$ (0.35% by weight).

$CaCO_3$ was obtained from Negev Industrial Minerals, Ltd. (Omer, Israel).

Instruments:

X-ray crystallographic analysis was performed on a Phillips PW 11000 diffractometer in the $\omega/2\theta$ mode using a graphite monochromator and MoK radiation.

Electron microscopy was performed using a XVP HV SEM electron microscope by Carl Zeiss SMT AG (Oberkochen, Germany).

Thermal coefficients of linear expansion (TCLE) were determined using a Chevenard Differential Dilatometer Model 5.

Preparation of Anorthite/TiO2 Glass-Ceramic:

79 kg coal ash, 8 kg Rutile sand and 13 kg $CaCO_3$ were comminuted and mixed together to make an oxide mixture.

100 kg of the oxide mixture was heated from 1350° C. to 1520° C. at a rate of between 50° C. $\mathrm{hour}^{-1}$ and 100° C. $\mathrm{hour}^{-1}$ in a MG-300 gas-fired glass-melting furnace (Falorni Glass Furnaces, Empoli, Italy). The melt was maintained at 1520° C. for 120 minutes to ensure thorough melting, convective mixing and the conversion of $CaCO_3$ to CaO.

The mixture was cooled to 1450° C. at a rate of 100° C. $\mathrm{hour}^{-1}$ and poured into a plurality of press molds to form 10 mm thick curved plates of 300 mm×250 mm and a curvature equivalent to that of a 400 mm cylinder. The molten glass was allowed to crystallize for four hours during cooling from 1020° C. to 950° C. at a rate of 30° C. $\mathrm{hour}^{-1}$.

The density of the glass-ceramic plates thus produced was roughly 2.7 g $\mathrm{cm}^{-3}$. It is clear to one skilled in the art that the glass-ceramic contained 8.9% by weight $TiO_2$, 39.2% by weight $SiO_2$, 25.3% by weight $Al_2O_3$ and 16.2% by weight CaO. The weight ratio CaO to $SiO_2$ was 2.43 and the weight ratio CaO to $Al_2O_3$ was 1.57. The ratio $SiO_2/Al_2O_3/CaO$ was 49:31:20, close to the desired 43:37:20 ratio of Anorthite. The glass-ceramic plates were resistant to water, acids and alkalines. It was possible to slowly etch the glass-ceramic plates using a concentrated HF solution.

It was possible to increase the strength of the glass-ceramic plates using both thermal tempering method and by chemical hardening. For chemical hardening, the surface of the glass-ceramic was etched with a 40% (v/v) HF solution to a depth of between about 100 and 200 microns. Subsequently, ion exchange was performed in the usual way using a 80% $KNO_3$/20% $K_2SO_4$ mixture (w/w) at between 500° C. and 600° C. for four hours.

Using an X-ray diffractometer, it was confirmed that the predominant crystal phase in the produced glass-ceramic plates was Anorthite.

Figure 3:
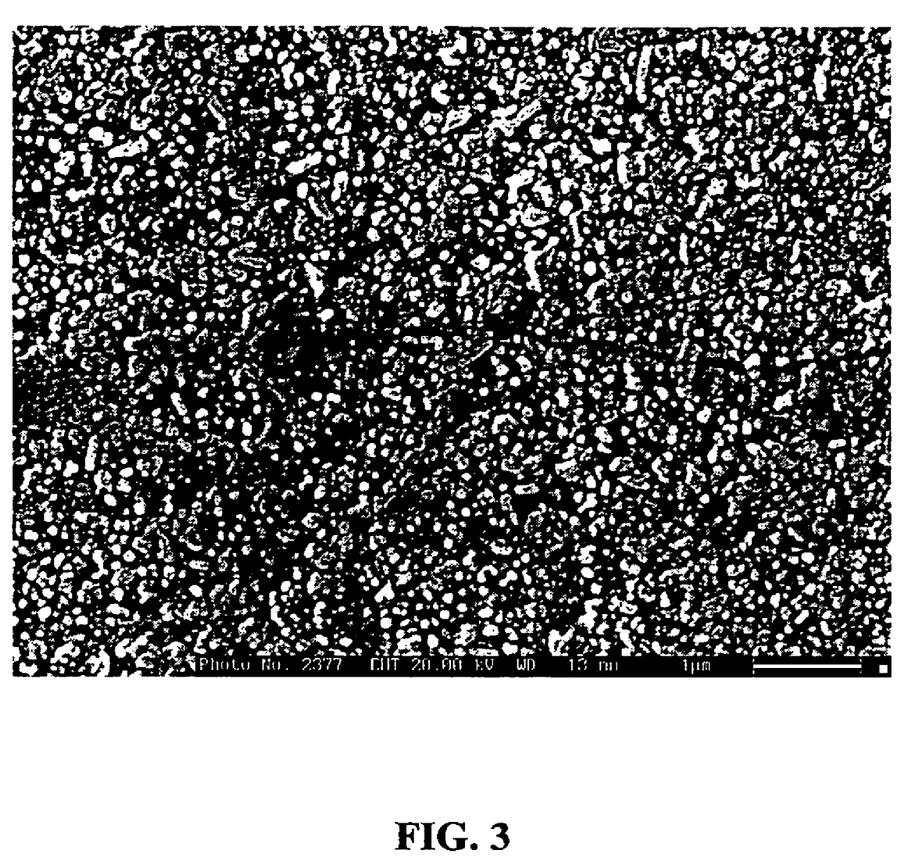
FIG. 3 is an electron microscope image of the surface of a composition of the present invention.

The surface of a produced glass-ceramic plate was examined using an electron microscope and shown to have a dense glass-ceramic structure with crystals of the order of 0.1 micron diameter, FIG. 3.

A swatch of woven aramid fabric (Twaron® CT microfilament 930 dtex, Teijin Twaron B.V., Arnhem, The Netherlands) was glued to the concave side of each plate using an abrasive sheet (ADP-422-X produced by Polyon-Barkai Industries Ltd., Kibbutz Barkai, Israel) in a vacuum chamber at between 150° C. and 170° C. for 1 hour.

Twelve glass-ceramic plates were tested in accordance with the NIJ 0101.03 and shown to effectively neutralize ballistic threats at the III and III-A levels. The results of the ballistic tests are summarized in Table 4, above.

A glass-ceramic plate was tested in accordance with the NIJ plasticine test. The result of the plasticine test is summarized in Table 5, above.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A method of protecting an object from kinetic threats comprising providing the object with armor including a glass-ceramic structure, said glass-ceramic structure comprising an Anorthite phase wherein said glass-ceramic structure comprises at least one additional crystalline phase having a thermal coefficient of linear expansion between about $5 \times 10^{-7}$ °C.$^{-1}$ and about $250 \times 10^{-7}$ °C.$^{-1}$.

2. The method of claim 1, wherein said glass-ceramic structure is part of a shielding device.

3. The method of claim 1, wherein said glass-ceramic structure comprises more than about 40% by weight Anorthite.

4. The method of claim 1, wherein said glass-ceramic structure comprises more than about 50% by weight Anorthite.

5. The method of claim 1, wherein said glass-ceramic structure comprises more than about 60% by weight Anorthite.

6. The method of claim 1, wherein said glass-ceramic structure comprises more than about 70% by weight Anorthite.

7. The method of claim 1, wherein said glass-ceramic structure comprises more than about 80% by weight Anorthite.

8. The method of claim 1, wherein said glass-ceramic structure comprises more than about 90% by weight Anorthite.

9. The method of claim 1, said glass-ceramic structure comprising CaO and $Al_2O_3$, the weight ratio of CaO to $Al_2O_3$ being between about 1:1.3 and about 1:2.5.

10. The method of claim 1, said glass-ceramic structure comprising CaO and $Al_2O_3$, the weight ratio of CaO to $Al_2O_3$ being between about 1:1.4 and about 1:2.3.

11. The method of claim 1, said glass-ceramic structure comprising CaO and $Al_2O_3$, the weight ratio of CaO to $Al_2O_3$ being between about 1:1.6 and about 1:2.1.

12. The method of claim 1, said glass-ceramic structure comprising CaO and $Al_2O_3$, the weight ratio of CaO to $Al_2O_3$ being between about 1:1.7 and about 1:1.95.

13. The method of claim 1, said glass-ceramic structure comprising CaO and $Al_{2O3}$, the weight ratio of CaO to $Al_{23}$ being between about 1:1.75 and about 1:1.89.

14. The method of claim 1, said glass-ceramic structure comprising CaO and $SiO_2$, the weight ratio of CaO to $SiO_2$ being between about 1:1.5 and about 1:3.0.

15. The method of claim 1, said glass-ceramic structure comprising CaO and $SiO_2$, the weight ratio of CaO to $SiO_2$ being between about 1:1.6 and about 1:2.8.

16. The method of claim 1, said glass-ceramic structure comprising CaO and $SiO_2$, the weight ratio of CaO to $SiO_2$ being between about 1:1.9 and about 1:2.4.

17. The method of claim 1, said glass-ceramic structure comprising CaO and $SiO_2$, the weight ratio of CaO to $SiO_2$ being between about 1:2.0 and about 1:2.3.

18. The method of claim 1, said glass-ceramic structure comprising CaO and $SiO_2$, the weight ratio of CaO to $SiO_2$ being between about 1:2.1 and about 1:2.2.

19. The method of claim 1, said glass-ceramic structure comprising more than about 5.0% by weight CaO.

20. The method of claim 1, said glass-ceramic structure comprising between about 15% and 23% by weight $SiO_2$, between about 13% and 20% by weight $Al_2O_3$ and between about 7% and 11% by weight CaO.

21. The method of claim 1, said glass-ceramic structure comprising between about 17% and 26% by weight $SiO_2$, between about 15% and 22% by weight $Al_2O_3$ and between about 8% and 12% by weight CaO.

22. The method of claim 1, said glass-ceramic structure comprising between about 19% and 28% by weight $SiO_2$, between about 16% and 24% by weight $Al_2O_3$ and between about 9% and 13% by weight CaO.

23. The method of claim 1, said glass-ceramic structure comprising between about 21% and 31% by weight $SiO_2$, between about 18% and 27% by weight $Al_2O_3$ and between about 10% and 14% by weight CaO.

24. The method of claim 1, said glass-ceramic structure comprising between about 22% and 34% by weight $SiO_2$, between about 19% and 29% by weight $Al_2O_3$ and between about 10% and 16% by weight CaO.

25. The method of claim 1, said glass-ceramic structure comprising between about 24% and 36% by weight $SiO_2$, between about 21% and 31% by weight $Al_2O_3$ and between about 11% and 17% by weight CaO.

26. The method of claim 1, said glass-ceramic structure comprising between about 26% and 39% by weight $SiO_2$, between about 22% and 33% by weight $Al_2O_3$ and between about 12% and 18% by weight CaO.

27. The method of claim 1, said glass-ceramic structure comprising between about 28% and 41% by weight $SiO_2$, between about 24% and 36% by weight $Al_2O_3$ and between about 13% and 19% by weight CaO.

28. The method of claim 1, said glass-ceramic structure comprising between about 29% and 44% by weight $SiO_2$, between about 25% and 38% by weight $Al_2O_3$ and between about 14% and 20% by weight CaO.

29. The method of claim 1, said glass-ceramic structure comprising between about 31% and 46% by weight $SiO_2$, between about 26% and 40% by weight $Al_2O_3$ and between about 14% and 22% by weight CaO.

30. The method of claim 1, wherein at least one said additional ciystalline phase has a thermal coefficient of linear expansion of between about $10 \times 10^{-7}$ °C.$^{-1}$ and $160 \times 10^{-7}$ °C.$^{-1}$.

31. The method of claim 1, wherein at least one said additional crystalline phase has a thermal coefficient of linear expansion of between about $20 \times 10^{-7}$ °C.$^{-1}$ and $80 \times 10^{-7}$ °C.$^{-1}$.

32. The method of claim 1, wherein at least one said additional crystalline phase is crystalline $TiO_2$.

33. The method of claim 32, wherein said crystalline $TiO_2$ is Rutile.

34. The method of claim 1, wherein said glass-ceramic structure further comprises $TiO_2$.

35. The method of claim 34, wherein said glass-ceramic structure comprises at least 0.3% by weight $TiO_2$.

36. The method of claim 34, wherein said glass-ceramic structure comprises at least 1% by weight $TiO_2$.

37. The method of claim 34, wherein said glass-ceramic structure comprises at least 2% by weight $TiO_2$.

38. The method of claim 34, wherein said glass-ceramic structure comprises at least 4% by weight $TiO_2$.

39. The method of claim 34, wherein said glass-ceramic structure comprises at least 6% by weight $TiO_2$.

40. The method of claim 34, wherein said glass-ceramic structure comprises between about 0.3% and 5% by weight $TiO_2$.

41. The method of claim 34, wherein said glass-ceramic structure comprises between about 5% and 10% by weight $TiO_2$.

* * * * *